United States Patent [19]
White

[11] 3,715,816
[45] Feb. 13, 1973

[54] AMUSEMENT BOOK FOR CHILDREN

[76] Inventor: Earle A. White, 1626 Sunnyside Avenue, Salt Lake City, Utah 84105

[22] Filed: Jan. 13, 1971

[21] Appl. No.: 106,229

[52] U.S. Cl. ........................ 35/73, 35/8 R, 40/104.18
[51] Int. Cl. .............................................. G09b 1/06
[58] Field of Search .......... 35/8 R, 56, 73; 40/104.18, 40/104.19, 142 R; 281/31

[56]  References Cited

UNITED STATES PATENTS

| | | | |
|---|---|---|---|
| 2,501,902 | 3/1950 | Howell | 35/56 |
| 2,995,865 | 8/1961 | Kiscadden | 35/56 UX |
| 3,274,706 | 9/1966 | Friend | 35/73 X |
| 3,316,699 | 5/1967 | Nachbar | 40/142 R |

*Primary Examiner*—Harland S. Skogquist
*Attorney*—M. Ralph Schaffer

[57] ABSTRACT

An amusement book for children including on pages thereof animal representation provided with releasable retaining means for releasably receiving the animal's natural food and, in combination therewith and on the same or an opposite page, the said food in its store or natural habitat for selective movement and releasable attachment to the animal representation proximate its mouth area.

11 Claims, 16 Drawing Figures

PATENTED FEB 13 1973 3,715,816

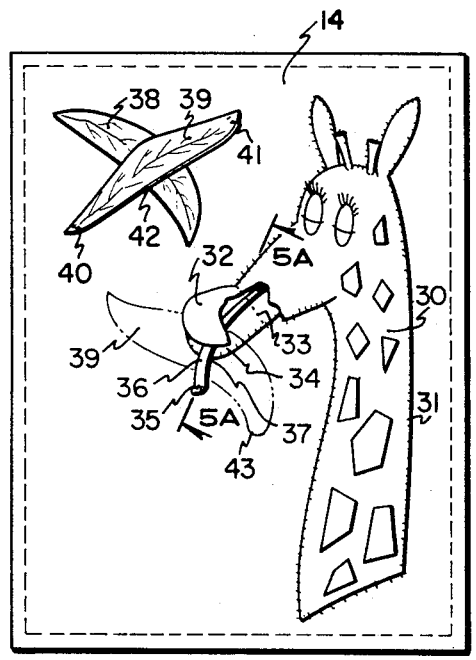
FIG. 5
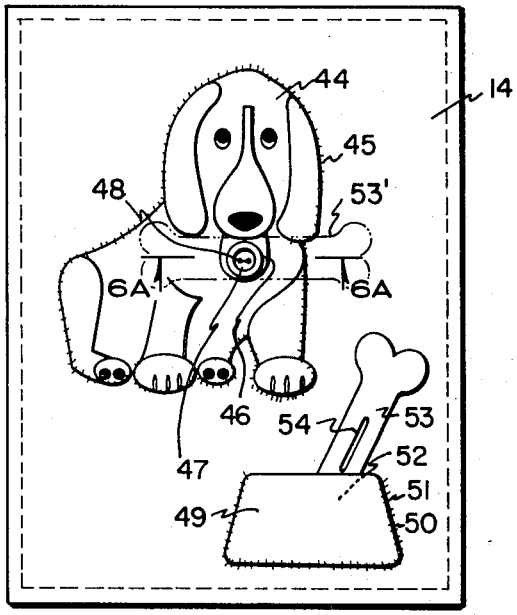
FIG. 6
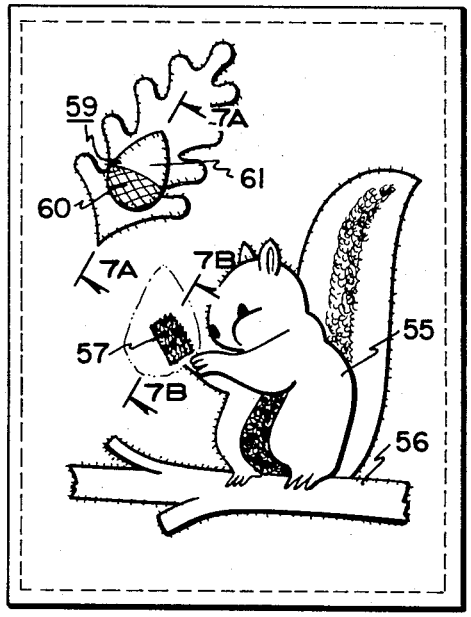
FIG. 7
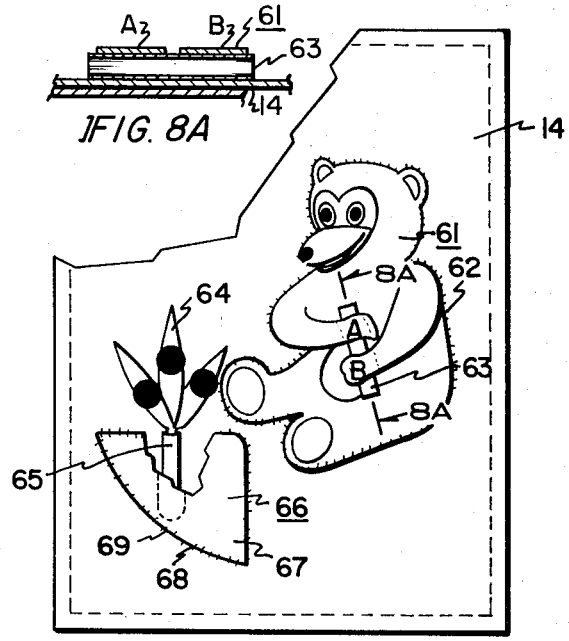
FIG. 8
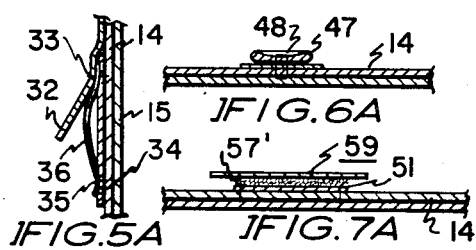
FIG. 5A    FIG. 6A    FIG. 7B
FIG. 7A

AMUSEMENT BOOK FOR CHILDREN

The present invention is related to an amusement book for children commonly known as "busy book" or "quiet books," and, more particularly, to a new and improved book wherein children may experience the simulated feeding of animals by removing a designed simulated food product from a page area and releasably securing the same proximate the mouth area of an animal representation.

In the past, parents and relatives of small children have experienced seeing children's delight in feeding animals at zoos. This of course, can be quite dangerous, and expecially for small children.

A second idea which the inventor has combined with the above is that of providing quiet books or "busy books" for children. Conventional books are made of oil cloth or fabric, and prior ones have been of extreme interest to children either in the home, or in church, or in other places where the child is hopefully to be quiet and occupied.

The present invention combines the idea of a quiet or busy book with the idea of a simulated feeding of animals. In this connection, the inventor is believed to be the first to provide an animal simulation in a child's book coupled with a stored food supply for such animal. The food selected is suitable for the animal in question and is retrieved from its natural habitat or natural storage place. As the disclosure which follows explains, the food is releasably attached to an area proximate the mouth area of the animal simulation by means of loops, tubes, buttons and so forth, the construction being so arranged that a visual appearance of actually eating is maintained. When the child wishes to return the food to its husk, plant, dish, ground, or other storage, then the child can easily disattach or release the same from the animal's mouth area and return it to the storage position. It is essential to note that the storage representation is convenient not only to hold or retain the food but actually simulates the identical source where the food will be found. Hence, the child is able to relate to a particular animal not only the food in question but also the particular and unique source from which the food comes.

Accordingly, a principal object of the present invention is to provide a new and approved quiet book for children.

An additional object is to provide a quiet book for children having pages provided with simulated animals or animal faces and, in proximity, therewith, a food supply which can be either disposed proximate the mouth area of the animal or returned to its natural storage position.

An additional object is to provide a sheet or page having animal representation provided with a releasable attachment means proximate its mouth area, this for releasable receiving of a simulated food.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 5 is a top plan of another page of the quiet book of the invention, illustrating giraffe and leaf members attached thereto or made integral therewith.

FIG. 5A is an enlarged section detail taken along the line of 5A—5A in FIG. 5.

FIG. 6 is similar to FIG. 5 but shows another page of the subject book having dog, bone and bone storage dish representation.

FIG. 6A is an enlarged fragmentary detail taken along the line of 6A—6A in FIG. 6.

FIG. 7 is similar to FIGS. 5 and 6 but illustrates squirrel, leaf, and nut simulations of another page.

FIG. 7A is an enlarged fragmentary detail taken along the lineof 7A—7A in FIG. 7.

FIG. 7B is an enlarged fragmentary detail taken along the line of 7B—7B in FIG. 7 wherein the attachment means is illustrated, prior to the releasable securement thereto of the simulated nut member.

FIG. 8 is a fragmentary top plan of another page of the subject book wherein the animal representation takes the form of a bear holding a tube receptacle, the same page including a removable plant simulation releasable mounted in a tube of an earth storage area.

FIG. 8A is an enlarged fragmentary section taken along 8A—8A in FIG. 8.

Figure 1:
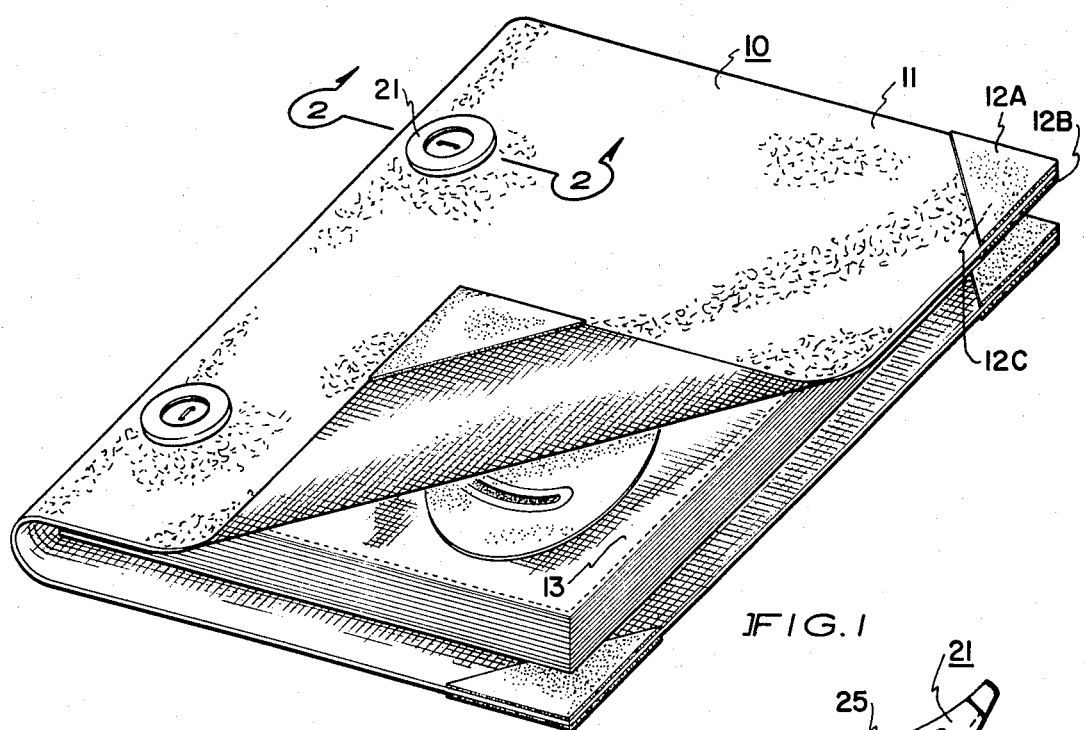
FIG. 1 is a perspective view of a child's quiet book constructed in accordance with the principles of the present invention.
Figure 2:
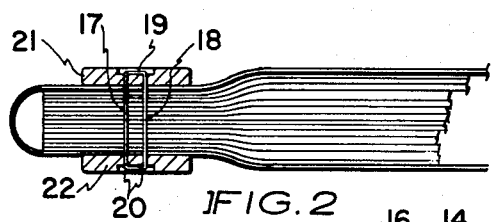
FIG. 2 is an enlarged fragmentary section taken along the line 2—2 in FIG. 1; for clarity of illustration the page and cover thicknesses are void of normal section lines.

In FIG. 1 the child's book 10 in the present invention is shown to include an outer cover 11 which is preferably flexible and made from a fabric-backed vinyl, by way of example. The cover 11 is folded in a double-backed configuration in FIG. 1. The same includes respective inner and outer trangular tabs 12A and 12B forming interior pockets at 12C between the tubes and the cover. These may be used for decorative uses or to use stiffeners, if needed.

The book 10 is provided with a series of pages 13 which, in one form of the invention, comprises a pair of sheets 14, 15 stitched together by thread stitching 16. The several stacked pages 13 are provided with mutually aligned apertures 17 and 18 for receiving a securement thread, metal loops, or other means 19. The latter is disposed through the respective apertures 20 of buttons 21 and 22.

Sheet 15 of each page merely serves as a backing sheet so that a clean, "opposite-page" appearance is had.

Each of the sheets 14 is provided with a creature, such as an animal representation. Thus, in FIG. 3 the head of a monkey 16' is shown. The same can be stitched, glued or otherwise secured to sheet 14 about its edges at 17'. In construction, the sheets 14 and 15 may be fabricated from a sheeting material such as muslin, whereas the animal or other representations at 16' may be made from felt suitably colored or stitched to form the eyes, nose, mouth area, and so forth. Mouth 18' is opened at 19', and the interior area at 20' between the face figure and the front side of sheet 14 forms a pocket B for receiving food such as a peeled "banana" representation or member as at 26 in FIG. 3B.

It is important, for the child's proper enjoyment of the book, that a source of food appear proximate the animal representation, i.e., either on the same page or on the opposite page. Thus, the outer skin of the banana may be simulated by a skin enclosure 21. The same can comprise simply a felt piece stitched at 22 and 23 to sheet 14. The banana member 21 is provided with a zipper 24 to close the opening or slot 25 of the banana (skin) member.

In use, so far as the structure illustrated in FIGS. 2, 3A, 3B, 4A, and 4B is concerned, the child in use of the same will open the zipper 24 to receive and withdraw the banana 26. Once the same is withdrawn the user will simply "feed the animal" by depositing the peeled banana 26 through the mouth at 18 into the pocket B defined by sheet 14 and the animal head representation such as the monkey head 16 in FIG. 3.

Figure 3A:
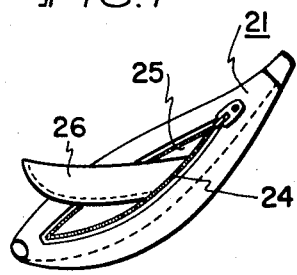
FIG. 3A is a view of the banana area of the page in FIG. 3 wherein the slot in the banana skin has been released or unzipped such that the edible banana simulation may be released and withdrawn therefrom.
Figure 3:
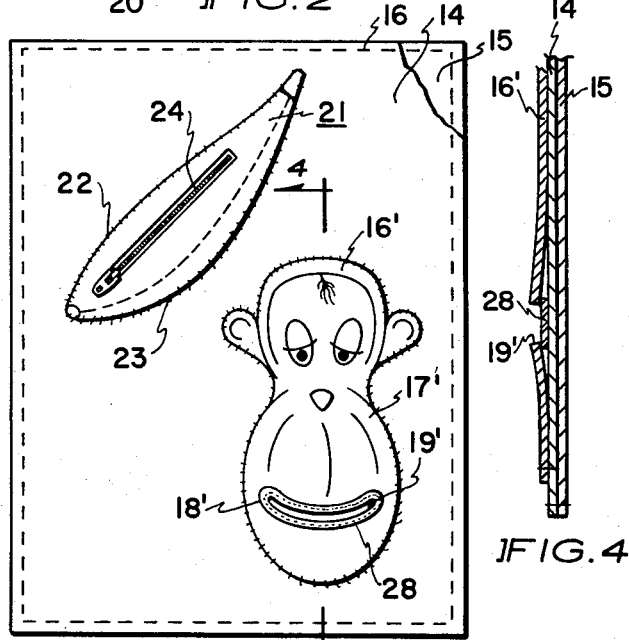
FIG. 3 is a top plan of one page of the book shown in FIG. 1.
Figures 3B, 4A, 4B:
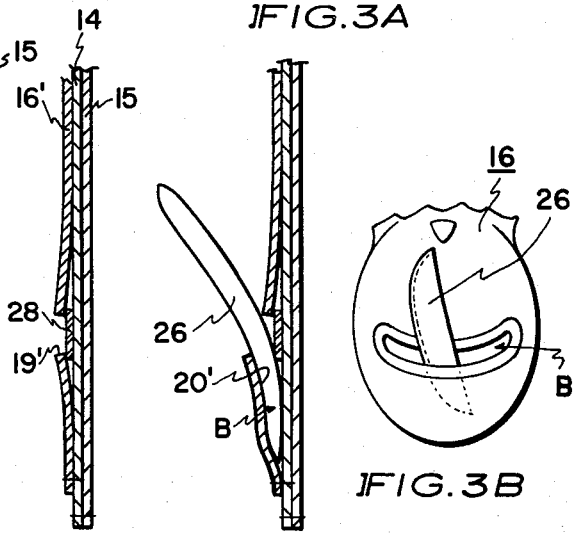
FIG. 3B is an enlarged fragmentary detail of the mouth portion of the monkey representation in FIG. 3, illustrating that the mouth area may receive and contain an edible banana representation as shown in released condition in FIG. 3A.
FIG. 4A and 4B are enlarged fragmentary sections taken along the line 4—4 in FIG. 3, illustrating the animal representation in its normal position and also when containing a food proximate the mouth area, respectively.

If desired, a red mouth area may be provided by a red fabric piece 28, stitched or otherwise secured to the sheet 14 proximate the mouth area 19' as seen in FIG. 3.

In FIG. 5 the sheet 14 is provided with a giraffe member 30 taken the form of a composite giraffe head and neck which is stitched about its periphery as at 31 to sheet 14. A nose piece 32 thereof is stitched at 33 through jaw member 34 to sheet 14. Likewise stitched in place at 35, and by the stitching 33, is a red tongue 36, the same defining a receiving loop at 37. A leaf 38 is removable from its leaf overlay 39 is provided with stitching at 40 and 41 to provide a loop or receiving area 42. Thus, in use the child may remove the leaf 38 from its solid line position shown in FIG. 5 and replace the same through the tongue loop at 37, to assume the dotted line position at 43. Hence, the child may "feed the animal" by removing the leaf 38 from its position underneath the loop overlay at 39 and feed to the animal by positioning the same underneath its tongue 36.

In FIG. 6 an animal representation 44 such as a dog is made of felt and is stitched about its periphery at 45 to a new sheet 14. The dog tongue at 46 is provided with a button 47, the same being secured by thread loop 48 to sheet 14.

At the lower right hand side of 36 there is a dog's dish 49 stitched about its periphery 50 by stitches 51. The same forms an open pocket 52 for receiving bone representation or member 53. The "bone" is removable from the "dish" and is provided with a slot 54 accommodating the releasable insertion of fixed button 47. Thus, the bone 53 may be removed from its solid line position and buttoned in place, so that the bone 53 assumes the position shown by the phantom line 53'.

In FIG. 7 a squirrel representation 55 is illustrated, the same including a log portion 56. Near the squirrel's front paws is a securement member 57 which may be glued or stitched in place, as desired. The securement member preferably takes the form as an adhering base known to the trade under the trade name "Velcro." A cooperating Velcro base 57' is secured to the underside of a felt acorn nut under the representation 59. The nut may be attached at 60 and have a nut-line appearance at 61, as desired. Thus, as the page illustrates in FIG. 7, the child may selectively remove and also replace the "nut" 59 from its solid line position and may mount the same in the squirrel's paws, proximate the mouth area of the same, by attaching the nut to the Velcro strip 57.

In FIG. 8 animal representation 61 taking the form of a small bear, as indicated. The same may be made of felt and stitched at 62 to the sheet 14. A holder 63 is provided in the bear's paws, and the holder may simply comprise a segment of a plastic tube. Flower member 64 is deposited in a corresponding tube 65, set into and/secured to a ground area 66. The latter may take the form of an earth member 67 secured at its periphery 68 to the sheet 14 by thread means 69. Thus, the "flower" may be retrieved from "earth" and deposited into the tube 63, clasped by the bear's arms A and B; then the flowers may be returned to "earth," i.e., to the tube 65 shown by the solid-line configuration in FIG. 8.

What is provided, hence, is a "busy book" for children for enjoyable use for essentially long periods of time by a simulation of "feeding of animals," as through retrieving a "food" article from its natural habitat or environment and permitting the same to be deposited proximate the animal's mouth and releasable secured thereto as by loop means or other attachment means such as Velcro, a button, a tube, and so forth. Subsequently, the food can be returned to its natural storage environment.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. An amusement book for children including, in combination, a cover; at least one page disposed within and secured to said cover, said page being provided on a surface thereof with a living creature representation, said living creature representation being provided a mouth area and means for releasably receiving and retaining, proximate said mouth area, a natural food representation for such living creature representation; a natural food representation, as aforesaid; a storage representation, simulating a natural storage source for said natural food representation, disposed within said cover and having means for releasably receiving and thereby storing said natural food representation, said storage, natural food, and living creature representations being mutually constructed and arranged such that a child may store said natural food representation in said natural storage means and, when he so desires, may transfer and releasably secure said natural food representation proximate said mouth area of said living creature representation.

2. Structure according to claim 1 wherein said living creature representation and said storage representation are both disposed on the same one of said pages 3. Structure according to claim 1 wherein said living creature and said storage representation are both disposed on the same side of a respective page within said cover.

4. Structure according to claim 1 wherein said releasably receiving and retaining means of said living creature representation comprises a button, said natural food representation including a button-hole for releasably receiving said button.

5. Structure according to claim 1 wherein said mouth area is configured at said releasably receiving and retaining means as a loop, said natural food representation being constructed to be releasably retained within said loop.

6. Structure according to claim 1 wherein said mouth area is configured to form a pocket to comprise said releasably receiving and retaining means, said natural food representation being constructed for releasable insertion within said pocket.

7. Structure according to claim 1 wherein said releasably receiving and retaining means of said living creature representation comprises a tube, said natural food representation comprises a plant representation, said storage representation comprises the simulation of earth, such simulation being provided with a storage tube comprising said releasably receiving means, said plant representation being releasably mounted within and selectively transferable with respect to said tubes.

8. Structure according to claim 1 wherein said natural food representation comprises a food naturally enclosed in a container in nature, a husk-like enclosure secured to said page and provided with an opening for releasably receiving said natural food.

9. Structure according to claim 1 wherein said releasably receiving means of both said living creature representation and said natural storage source each comprises a securement fabric.

10. An amusement device for children including, in combination, a page and, on a surface thereof: a living creature representation, said living creature representation being provided a mouth area including means for releasably receiving and retaining, proximate said mouth area, a natural food representation for such living creature representation; a natural food representation, as aforesaid, a storage representation, simulating a natural storage source for said natural food representation, disposed on said device and having means for releasably receiving and thereby storing said natural food representation, said storage, natural food, and living creature representations being mutually constructed and arranged such that a child may store said natural food representation in said natural storage means and, when he so desires, may transfer and releasably secure said natural food representation proximate said mouth area of said living creature representation.

11. An amusement device for children including, in combination, pages, at least one of said pages having: a living creature representation, said living creature representation being provided a mouth area including means for releasably receiving and retaining, proximate said mouth area, a natural food representation for such living creature representation; a natural food representation, as aforesaid; a storage representation, simulating a natural storage source for said natural food representation, disposed on said device and having means for releasably receiving and thereby storing said natural food representation, said storage, natural food, and living creature representations being mutually constructed and arranged such that a child may store said natural food representation in said natural storage means and, when he so desires, may transfer and releasably secure said natural food representation proximate said mouth area of said living creature representation.

* * * * *